Oct. 31, 1961 W. D. SCHUSTER 3,007,079

DEFLECTION CIRCUITRY

Filed Jan. 20, 1958

INVENTOR
WILLIAM D. SCHUSTER
BY Norman [signature]
ATTORNEY

1

3,007,079
DEFLECTION CIRCUITRY
William D. Schuster, Oakfield, N.Y., assignor, by mesne assignments, to Sylvania Electric Products Inc., Wilmington, Del., a corporation of Delaware
Filed Jan. 20, 1958, Ser. No. 710,056
6 Claims. (Cl. 315—29)

Figure 1:
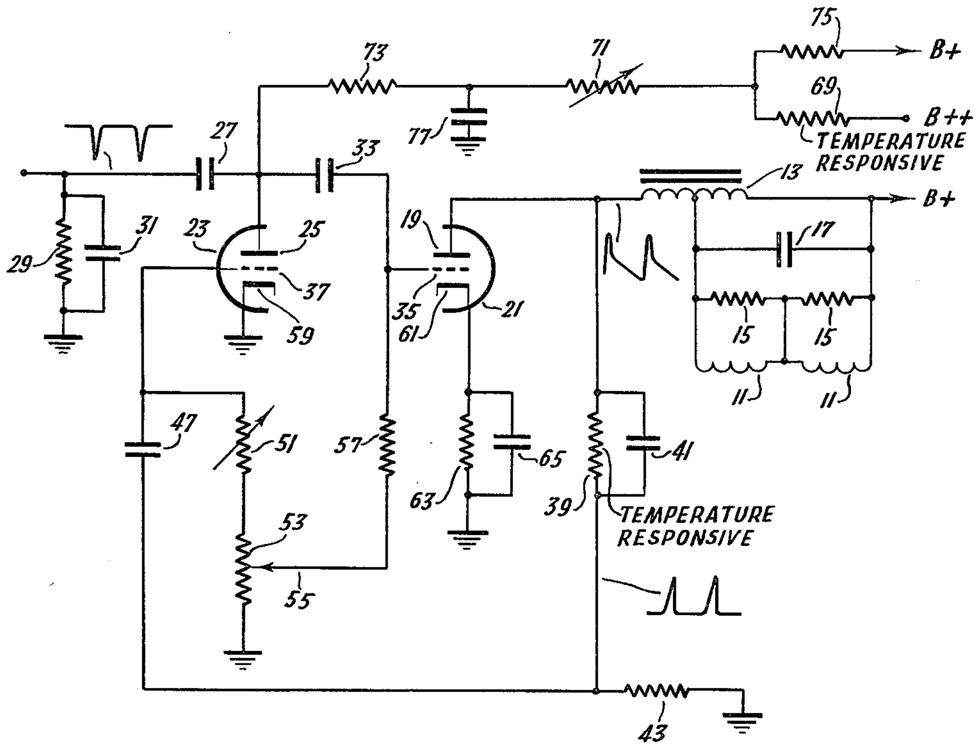

This invention relates generally to television receiver circuitry and more specifically to magnetic deflection circuitry in a television receiver.

Though, prior art television receivers using relatively large cabinets seldom encounter synchronization and scan size variations arising from changes in ambient temperature, emphasis on tight packaging in smaller cabinets has made it difficult to obtain sufficient convection cooling for many of the necessary circuit components. As a result internal ambient cabinet temperature change has become an important engineering consideration.

For example, in certain types of vertical deflection circuits, especially those requiring extremely high scan efficiency due to power supply limitations, available scan length is decreased by any increase in the resistance value of the deflection yoke brought about by a temperature change. Though controls are supplied to allow the viewer to change the length of scan, automatic stabilization is most desirable.

Further, in certain types of deflection circuitry, especially those wherein a feed back signal is supplied from the deflection yoke winding, the rate of scan is also undesirably modified by changes in the yoke winding temperature. Manual hold controls are provided but again automatic stabilization is most desirable.

Thus it is an object of this invention to provide television receiver scanning which is relatively free of variations arising from changes in ambient temperature.

It is a further object of this invention to minimize temperature variations in image scan length and frequency without substantial loss of scan efficiency.

It is a still further object of this invention to fully utilize the exponential waveform of a capacitor type saw-tooth generator in producing a substantially linear trace.

Briefly one aspect of the invention herein described and claimed comprises an improvement in deflection circuits of the type having a vertical output tube driven deflection winding supplied with a trapezoidal signal generated in a resistance-capacitance circuit wherein the capacitor is discharged at a given frequency by an electron tube controlled by the combination of a sync pulse and a feed back pulse derived from the deflection winding and fed through a time constant circuit, said improvement comprising a first temperature responsive device coupled to increase the charging potential of the capacitor in the trapezoidal signal generating circuit with increases in ambient temperature and a second temperature responsive device coupled to modify the shape of the feed back pulse with increases in ambient temperature so as to maintain capacitor discharge frequency substantially independent of temperature changes in the deflection winding.

For a better understanding of the present invention, together with other and further objects, advantages and capabilities thereof, reference is made to the following disclosure and appended claims in connection with the accompanying drawing in which:

FIG. 1 which is a schematic circuit drawing of a specific embodiment, and

Figure 2:
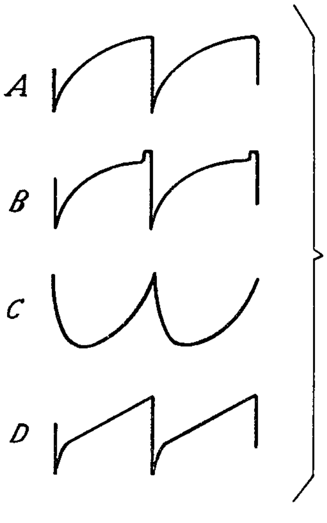

FIG. 2 which are curves to be used in explaning circuit operation.

Referring to FIG. 1 there is shown a vertical deflection circuit supplying deflection scan current to the series connected yoke windings 11 which are coupled at one end to a source of B+, not shown, and coupled at the other end to a tap on autotransformer 13. Resistors 15 and capacitor 17 are coupled across the yoke windings 11 and B+ is fed through autotransformer winding 13 to the anode 19 of vertical output tube 21.

2

Vertical output tube 21 comprises one tube of an unsymmetrical free-running multivibrator with the second tube comprising discharge tube 23 having an anode 25 which is coupled to one plate of saw-tooth capacitor 27. As can be seen from the drawings, tubes 23 and 21 may be enclosed in a single envelope, if desired. The other plate of saw-tooth capacitor 27 is coupled to ground through peaking resistor 29 which may be by-passed by a capacitor 31.

To complete the multivibrator arrangement, anode 25 of discharge tube 23 is coupled through capacitor 33 to control grid 35 of the vertical output tube 21 and anode 19 of vertical output tube 21 is coupled back to the grid 37 of discharge tube 23 through a network comprising a temperature responsive resistance or thermistor 39 connected in parallel with capacitor 41. Capacitor 41 acts in conjunction with resistor 43 as a differentiator to supply the feed back signal through capacitor 47 to grid 37 of the discharge tube 23.

Variable resistor 51 is used as a vertical hold control acting to discharge capacitor 47 at a rate governed by its setting. Potentiometer 53 having a variable tap 55, acts as a linearity control feeding a signal and bias through resistor 57 to grid 35 of vertical output tube 21. Cathode 59 of the discharge tube 23 may be connected directly to ground and cathode 61 of the vertical output tube 21 may be connected to ground through a self-biasing network comprising resistor 63 and capacitor 65.

Charging potential for the saw-tooth capacitor 27 is supplied, under normal operating conditions, from a source of B++, not shown, through a temperature responsive resistance or thermistor 69, a variable resistor or height control 71 and fixed resistor 73. Capacitor 77 acts as a filter.

As the B++ voltage, where used, is normally developed in the horizontal deflection B boost circuit, it may be desirable to provide a connection to the B+ of the low voltage supply, not shown, through resistor 75. Thus in those instances where the horizontal deflection circuit fails, reasonably adequate plate voltage and capacitor charging voltage is supplied to discharge tube 23 and sawtooth capacitor 27 from the low voltage B+ supply.

To consider circuit operation in detail, assume that drive tube 21 is nearing the end of its conduction period and discharge tube 23 is nearing the start of its conduction period. In other words the circuit is nearing the end of the trace portion and is approaching the retrace portion of the cycle.

During trace the load on vertical drive tube 21 may be considered essentially resistive. During this portion of the cycle current flowing through deflection coils 11 builds up in a substantially linear manner governed by the change in impedance between anode 19 and cathode 61 of drive tube 21 as controlled by the voltage waveform applied to control element or electrode 35. The retrace portion of the cycle is initiated by conduction in discharge tube 23. Thus, when the voltage applied to control electrode or element 37 of discharge tube 23 increases in a positive going direction and passes cut-off, current starts to flow between anode 25 and cathode 59, forming a discharge path for saw-tooth capacitor 27 through peaking resistor 29. The resulting drop in potential at anode 25 is applied through coupling capacitor 33 to the control electrode 35 of drive tube 21, tending to drive conduction in tube 21 toward cut-off. As conduction in tube 21 moves toward cut-off the potential of anode 19 increases and the increase in potential is fed to control electrode 37 of discharge tube 23, thereby further decreasing the internal impedance of discharge tube 23 by further increasing conduction between anode 25 and cathode 59. The resulting voltage drop across peaking resistor 29 provides a strong negative going peak voltage which is coupled through capacitor 33 to drive the control element 35 of drive tube 21 near or below cut-off potential.

As conduction in drive tube 21 is driven toward cut-off the inductive action of its load becomes important to consider. Thus a large positive going voltage peak is generated in deflection coils 11, at this point in the cycle, due to the collapsing magnetic field. The resulting waveform is differentiated through action of capacitor 41 and resistor 43 and fed back through capacitor 47 to the control electrode 37 of discharge tube 23 causing current flow through the control electrode 37 cathode 59 path of discharge tube 23 which acts as a clamp to ground. The resulting charge built up on capacitor 47 is polarized to drive conduction in tube 23 rapidly toward cut-off.

When conduction in discharge tube 23 is thus driven to cut-off saw-tooth capacitor 27 starts to charge through resistor 73, height control resistor 71 and resistor 69. The resulting increase in potential at anode 25 of discharge tube 23 is coupled back to the control element 35 of drive tube 21 and current flow is again started between anode 19 and cathode 61. As saw-tooth capacitor 27 continues to charge, more and more current flows in tube 21 and winding 11, thereby supplying the trace portion of the cycle.

In prior art circuits, it was customary to supply an exceptionally high potential from which saw-tooth capacitor charging currents might be drawn. Thus it was possible to select a small, relatively linear portion of the exponential waveform across the capacitor to provide a relatively large drive voltage. In the circuit of FIG. 1, the source of charging potential need only be of a magnitude slightly larger than the peak to peak voltage of the complete resulting saw-tooth waveform even though the voltage across the saw-tooth capacitor is exponential in form as shown in FIG. 2A, in idealized form.

Since the trace portion of the waveform applied to control element 35 of drive tube 21 should be essentially linear, assuming that drive tube 21 is operating on a relatively linear portion of its $e_g$-$i_p$ characteristic, a second waveform having a shape somewhat as that shown in FIG. 2C, in idealized form, is also applied to control element 35 from a tap 55 on potentiometer 53. The resultant waveform impressed on control element 35 is effectively the sum of curves FIG. 2A and FIG. 2C, as shown in FIG. 2D, in idealized form.

The waveform of FIG. 2C is effectively an integrated version of the waveform FIG. 2B, shown in idealized form, as applied to control element 37 of discharge tube 23. Variation of the resistance 51 connected to control element 37 modifies the buildup of the control signal and thus affords vertical hold control. The signal taken from tap 55 on potentiometer 53 is then integrated through action of the resistance of resistor 51 and potentiometer 53 and resistor 57 along with capacitors 27, 31 and 33. In one particular embodiment the peak to peak amplitude of the waveform FIG. 2C was in the order of 65 volts making it possible to supply a waveform FIG. 2D to control element 35, having a peak to peak voltage of approximately 175 volts, even though the effective charging potential on the discharge tube side of height control resistor 71 was in the order of 180 volts.

The vertical sync pulses shown in FIG. 1 as being coupled through capacitor 27 stabilize the circuit as to scan rate, locking it in with the received television picture signal. This sync information can be considered as being amplified in drive tube 21 and fed back in a positive sense to the control electrode 37 of the discharge tube 23. If desired, positive going sync pulses could be fed directly to control element 37.

Present day circuitry is closely packed in cabinetry of limited volumn, and as a result the heat dissipated by tubes and other circuitry is difficult to exhaust before it has an opportunity to change the resistance value of the yoke winding.

Changes in yoke resistance normally changes both the resulting scan height and the rate of scan. For example, increase in yoke resistance causes a decrease in yoke current assuming a relatively constant relationship between the voltage output of the drive tube and the input grid voltage. This decrease in yoke current decreases the length of scan.

The circuit of FIG. 1 differs from prior art structures in that it is adapted to remain stable through relatively large changes in ambient temperature. A portion of this stability arises from the use of temperature responsive resistance 69 which is positioned internal the cabinetry so as to be influenced by changes in ambient temperature. Thus as the internal cabinet temperature rises, the resistance of the temperature responsive resistor 69 decreases to impress a higher charging potential on saw-tooth capacitor 27, with a resulting increase in the peak to peak value of the exponential waveform taken from saw-tooth capacitor 27 and a resulting increase in the peak to peak voltage of waveform FIG. 2D as applied to control element 35 of drive tube 21. As a result, scan length remains relatively constant regardless of substantially any change in internal cabinetry ambient temperature.

With regard to scan rate changes with temperature, it is to be noted that the voltage waveform at the anode 19 of drive tube 21 is used as a feed back signal voltage to charge timing capacitor 47, and thus any change in its peak to peak amplitude arising from temperature change results in a change of multivibrator frequency or scan rate. This can be seen by considering the components included in the feed-back signal, i.e., the saw-tooth component and the pulse component arising from the collapsing magnetic field in yoke 11 at retrace. Thus as the temperature increases thereby increasing the resistance of yoke 11, the saw-tooth component of the feed back voltage tends to increase and the pulse component tends to decrease. Since the pulse component of the feed back signal is the primary factor in charging the timing capacitor 47, any decrease therein tends to speed up multivibrator or scan frequency. Though the differentiating action of capacitor 41 and resistor 43 normally removes the greater part of the saw-tooth component and passes the pulse component, temperature responsive resistor 39 is coupled to by-pass capacitor 41 and allows at least a portion of the saw-tooth component to be fed back to control element 37 of discharge tube 23. In other words resistance 39 decreases the amount of differentiation which would otherwise result in capacitor 41 and resistance 43.

As the temperature of the circuit increases the resistance of temperature responsive resistor 39 decreases so as to allow a larger portion of the negative going saw-tooth component to appear at control electrode 37. This results in a delay in the period required for the voltage on control electrode 37 to build up past cut-off and thus slows down multivibrator frequency or scan rate.

It is to be noted that the two temperature responsive resistances or thermistors 39 and 69 are positioned external of the yoke current circuit thereby eliminating any loss of scan which would result from placing temperature responsive resistance directly in the yoke current circuit.

The resulting structure is extremely stable even though the yoke winding may experience reasonably large temperature changes and this stability is realized automatically without requiring adjustment of customer controls. Further the resultant circuit is extremely efficient in utilizing the complete exponential waveform of the saw-tooth capacitor through relatively large changes in ambient temperature, thereby minimizing B+ low voltage requirements.

Without being limited to any specific circuit parameters, such parameters varying in accordance with individual operational requirements, the following circuit values have been found entirely satisfactory in one successful embodiment of the invention:

| | |
|---|---|
| Tubes 21 and 23 | ½ of 10 DE7. |
| B+ | 250 volts. |
| B++ | 600 volts. |
| Capacitors: | |
| 17 | .22 microfarad. |
| 27 | .033 microfarad. |
| 31 | .01 microfarad. |
| 33 | .047 microfarad. |
| 41 | .10 microfarad. |
| 47 | .0022 microfarad. |
| 65 | 100 microfarads. |
| 77 | .33 microfarad. |
| Resistors: | |
| 15 | 2200 ohms. |
| 29 | 22K. |
| 43 | 18K. |
| 51 | 1.5 megohms. |
| 55 | 1.0 megohm. |
| 57 | 1.0 megohm. |
| 63 | 150 ohms. |
| 39 | 500K at 25° C.[1] |
| 69 | 1 meg. at 25° C.[1] |
| 71 | (Variable) 2.5 megohms. |
| 73 | 1.2 megohms. |
| 75 | 220K. |
| Transformer 13 | 10:1 step down. |
| Yoke 11 | Approximately 17 ohms and 15 millihenrys. |

[1] Thermistors resistance value drops with temperature increase to about ½ value at 75° C.

While there has been shown and described what is at present considered the preferred embodiment of the invention, in view of this disclosure, it will become apparent to those skilled in the art that various changes and modifications may be made without departing from the invention as defined in the appended claims.

Having thus described my invention, I claim:

1. In a television receiver vertical deflection circuit the combination comprising a vertical deflection winding, a capacitor charging circuit, a signal controlled capacitor discharge path having a control element, a source of vertical sync signals coupled to said control element, feed back signal controlled bias means coupled between said winding and said control element to provide timing control of said discharge path in conjunction with the sync signals, a first temperature responsive device coupled to increase the charging rate through said capacitor charging circuit with increases in temperature and a second temperature responsive device coupled in said feed back signal controlled bias means to maintain timing control of said discharge path with increases in temperature.

2. In a television receiver vertical magnetic deflection circuit the combination comprising a vertical deflection yoke winding, a grid controlled output tube coupled to supply deflection current through said winding; said winding having a resistive component which increases in value with temperature increases and an inductive component; a series connected charging resistance, saw-tooth capacitor and peaking resistance; a grid controlled discharge tube coupled to discharge said saw-tooth capacitance; means coupling a feed back signal from said winding through a time constant circuit to bias the grid of said discharge tube below cut-off for a given period during the deflection cycle, means coupling sync pulses to the grid of said discharge tube; a first temperature responsive device coupled to increase the charge rate of the saw-tooth capacitor with increase of winding temperature; and a second temperature responsive device coupled to modify the shape of the feed back signal with increase of winding temperature so as to maintain the bias on the grid of said discharge tube below cut-off for said given period.

3. In a television receiver vertical magnetic deflection circuit the combination comprising a vertical deflection yoke winding, an output device coupled to supply deflection current through said winding; said winding having a resistive component which increases in value with increases in ambient temperature and an inductive component; a series connected charging resistance, saw-tooth capacitor and peaking resistance; a discharge device coupled to discharge said saw-tooth capacitance; said output device and said discharge device having control elements; means coupling a feed back signal from said winding through a time constant circuit to bias the control element of said discharge device below cut-off for a given period during the deflection cycle; means coupling sync pulses to the control element of said discharge device; a first temperature responsive device coupled to increase the charge rate of the saw-tooth capacitor with increase of ambient temperature; and a second temperature responsive device coupled to modify the feed back signal with increase of ambient temperature so as to maintain the bias on the control element of said discharge device below cut-off for said given period.

4. In a television receiver vertical magnetic deflection circuit of the type having a vertical output tube driven deflection winding supplied with a trapezoidal control signal generated in a resistance capacitance circuit wherein the capacitor is discharged at a given frequency by an electron tube controlled by the combination of a sync pulse and a feed back pulse derived from the deflection winding and fed through a time constant circuit the improvement comprising a first temperature responsive device coupled to increase the charging potential of the capacitor in the trapezoidal signal generating circuit with increases in ambient temperature and a second temperature responsive device coupled to modify the feed back pulse with increases in ambient temperature to maintain capacitor discharge frequency substantially independent of changes in feed back contribution arising from deflection winding temperature changes.

5. In a television receiver vertical magnetic deflection circuit of the free-running asymmetrical type having two controlled conduction paths the combination comprising a first electron conduction path including a control element, a second electron conduction path including a control element, a source of sync signals coupled to one of said control elements, a separate output element for each conduction path, a saw-tooth capacitor charging circuit coupled to the output element of said first conduction path, an alternating current coupling between the output element of said first conduction path and the control element of said second conduction path, means for differentiating the output of said second conduction path, means coupling the output of said differentiating means to the control element of said first conduction path, and an integrating means coupled between the control elements of said conduction paths.

6. In a television receiver magnetic deflection circuit the combination comprising a discharge tube and a deflection winding drive tube each having an output electrode and a control electrode, capacitance means coupling the discharge tube output electrode to the drive tube control electrode, differentiating means coupling the drive tube output electrode to the discharge tube control electrode to form an asymmetrical free-running multivibrator circuits, a source of sync signals coupled to the control electrode of one of said tubes, a saw-tooth capacitance circuit coupled to discharge through said discharge tube, and a peaking resistance and an integrating means coupled between the control electrode of the discharge and drive tubes.

References Cited in the file of this patent

UNITED STATES PATENTS

| | | |
|---|---|---|
| 2,596,590 | Overton | May 13, 1952 |
| 2,628,326 | Bridges | Feb. 10, 1953 |

| | | |
|---|---|---|
| 2,729,766 | Vilkomerson | Jan. 3, 1956 |
| 2,761,090 | Thalner | Aug. 28, 1956 |
| 2,761,970 | Owens | Sept. 4, 1956 |

OTHER REFERENCES

"Properties and Uses of Thermistors—Thermally Sensitive Resistors"; Transactions of the A.I.E.E.; vol. 65; November 1946; pages 711 to 725.